United States Patent Office 2,938,056
Patented May 24, 1960

2,938,056

2, SUBSTITUTED-1-METHYL-7-METHOXY-1,2,3,4,9,10-HEXAHYDROPHENANTHRENES

Alan H. Nathan and John A. Hogg, Kalamazoo, Mich., assignors to The Upjohn Company, Kalamazoo, Mich., a corporation of Michigan No Drawing. Filed Nov. 27, 1957, Ser. No. 699,176

4 Claims. (Cl. 260—586)

This invention relates to the novel compounds 1-methyl-2 - acyl - 7 - methoxy-1,2,3,4,9,10-hexahydrophenanthrene and dialkyl 2-(1-methyl-7-methoxy-1,2,3,4,9,10-hexahydrophenanthryl) carbinol and to methods for preparing these compounds.

The compounds of the invention have the Formulas I and II, below, and are prepared in accordance with the following series of formulas:

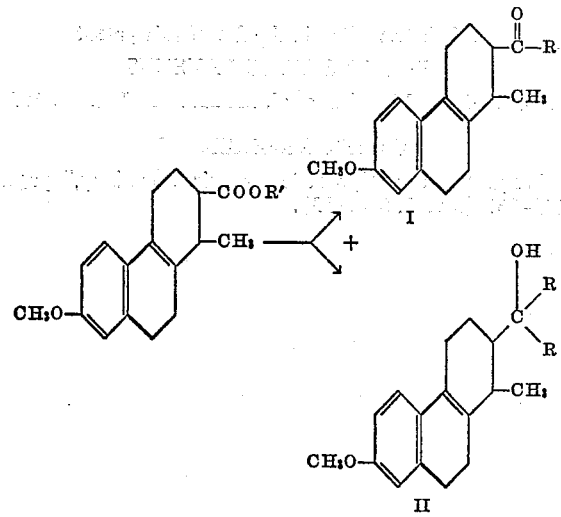

wherein R' is an organic radical having from one to twelve carbon atoms, inclusive, e.g., a straight or branched chain aliphatic radical and R is a lower-alkyl radical, i.e., a straight or branched chain alkyl radical having from one to eight carbon atoms, inclusive.

Compounds I and II, above, possess estrogenic properties and are useful in the treatment of acne, in controlling blood cholesterol levels, and are generally useful in the treatment of debilitation, especially that resulting from infectious disease.

The novel compounds of the invention are prepared by subjecting a 1-methyl-7-methoxy-1,2,3,4,9,10-hexahydrophenanthrene 2-carboxylate ester, preferably in solution in an organic solvent that is inert under the reaction conditions, such as dioxane, diethyl ether, dibutyl ether, benzene, toluene, tetrahydrofuran, and the like to the action of a lower-alkyl Grignard-type reagent, i.e., a lower-alkyl metal halide, methyl magnesium bromide being a typical example. Other lower-alkyl metal halides that can be used are ethyl magnesium bromide, n-butyl magnesium bromide, n-butyl magnesium iodide, isooctyl magnesium bromide, octyl magnesium bromide, n-hexyl magnesium bromide or chloride, and the like. The reaction can be carried out over a wide range of temperatures, from zero degrees centigrade up to 100 degrees centigrade; the top range of temperature being established by the reflux temperature of the reaction mixture. It is preferred to carry out the reaction at the temperature of reflux for a period of from two hours to one or more days, then to cool the reaction mixture and subject it to aqueous hydrolysis, preferably by means of an aqueous solution of an electrolyte such as ammonium, sodium or potassium salts, the chloride or sulfate being preferred.

The product of the Grignard reaction is a mixture of Compounds I and II, and this mixture of products can be isolated from the reaction mixture in a conventional manner such as by washing, drying and removing the solvent by evaporation. The two components of the mixture can be separated by fractional crystallization, by partition chromatography, or by known methods of separating ketones from admixture with non-ketones, as deemed necessary.

The following example is illustrative of the process and products of the present invention, but is not to be construed as limiting.

EXAMPLE 1

*1 - methyl-2-acetyl-7-methoxy-1,2,3,4,9,10-hexahydrophenanthrene and dimethyl 2-(1-methyl-7-methoxy-1,2,3,4,9,10-hexahydrophenanthryl)carbinol*

A solution of three grams of ethyl 1-methyl-7-methoxy-1,2,3,4,9,10-hexahydrophenanthrene 2-carboxylate (melting point 85 to 86 degrees centigrade; preparation of which is described in Example 1, U.S. Patent 2,732,389. Analysis.—Calcd. for $C_{19}H_{24}O_3$: C, 75.97; H, 8.05. Found: C, 76.00; H, 7.93), in fifty milliliters of ether was added to eight milliliters of commercial methyl magnesium bromide (4 Normal solution in ether). The mixture was refluxed for a period of eight hours, then cooled and hydrolyzed with aqueous ammonium chloride solution.

The product of the Grignard reaction was isolated by washing with water, drying, and evaporating the ether solution. The product was a mixture of oil and crystals.

A solution of 2.5 grams of the mixture in 150 cc. of methylene chloride was run through a 200-gram column of Florisil magnesium silicate, and the column was developed with increasing concentrations of acetone in Skellysolve B hexanes. The material eluted by two percent acetone and five percent acetone (one liter of each) amounted to 2.10 grams and was still an oil. Infrared spectroscopy revealed both hydroxyl and carbonyl functions, wherefore a Girard's P reagent separation into ketonic and non-ketonic fractions (Girard and Sandulesco, Helv. Chim. Acta 19, 1095 [1936]), was performed on the mixture. There was obtained thereby 1.46 grams of non-ketonic fraction [carbinol, II, dimethyl 2-(1-methyl-7-methoxy-1,2,3,4,9,10-hexahydrophenanthryl) carbinol] and 0.74 gram of ketonic fraction [ketone, I, 1-methyl-2-acetyl-7-methoxy-1,2,3,4,9,10-hexahydrophenanthrene]. Both were crystalline, and both, after recrystallization from petroleum ether (boiling point, thirty to sixty degrees centigrade), melted at 73 to 76 degrees centigrade. The melting point of a mixture of the two was depressed to sixty to 69 dergees centigrade. The infrared absorption of each confirmed the structure of each of the two compounds.

I. Analysis.—Calcd. for $C_{18}H_{22}O_2$: C, 79.96; H, 8.20. Found: C, 79.90; H, 8.09.

II. Analysis.—Calcd. for $C_{19}H_{26}O_2$: C, 79.68; H, 9.15. Found: C, 79.37; H, 9.12.

Substitution of other alkyl 1-methyl-7-methoxy-1,2,3,4,9,10-hexahydrophenanthrene 2-carboxylates prepared as described in U.S. Patent 2,732,389, including those in which the alkyl group is propyl, amyl, octyl, decyl, and dodecyl, in the process of the foregoing example is productive of the same products described above.

Substitution of other alkyl magnesium halides in the foregoing process, as for example, ethyl magnesium bromide or octyl magnesium bromide, is productive respectively of 1-methyl-2-propionyl-7-methoxy-1,2,3,4,9,10-hexahydrophenanthrene and diethyl 2-(1-methyl-7-methoxy-1,2,3,4,9,10-hexahydrophenanthryl) carbinol in the first instance and 1-methyl-2-octanoyl-7-methoxy-1,2,3,4,9,10-hexahydrophenanthrene and dioctyl 2-(1-methyl-7-methoxy-1,2,3,4,9,10-hexahydrophenanthryl) carbinol in the second instance.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 1 - methyl - 2 - acyl - 7 - methoxy - 1,2,3,4,9,10-hexahydrophenanthrene of the following structural formula:

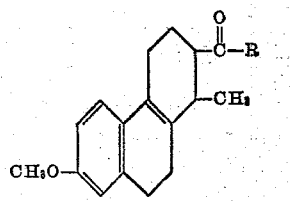

wherein R is an alkyl radical of from one to eight carbon atoms, inclusive.

2. Dialkyl 2-(1-methyl-7-methoxy-1,2,3,4,9,10-hexahydrophenanthryl) carbinol of the following structural formula:

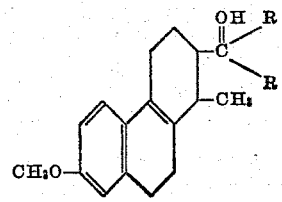

wherein R is an alkyl radical of from one to eight carbon atoms, inclusive.

3. 1 - methyl - 2 - acetyl - 7 - methoxy - 1,2,3,4,9,10-hexahydrophenanthrene of the following structural formula:

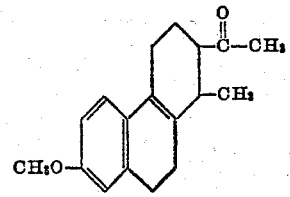

4. Dimethyl 2-(1-methyl-7-methoxy-1,2,3,4,9,10-hexahydrophenanthryl) carbinol of the following structural formula:

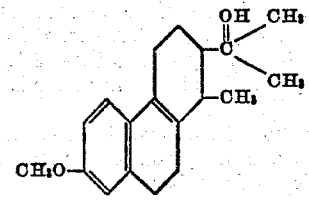

References Cited in the file of this patent

UNITED STATES PATENTS 2,494,253    Miescher et al.            Jan. 10, 1950

OTHER REFERENCES

Wagner et al.: "Synthetic Organic Chemistry," pages 165–167, page 336 (1953).